C. GUMLICH, Jr.
Hose Attachments for Street-Washers.
No. 212,599.  Patented Feb. 25, 1879.
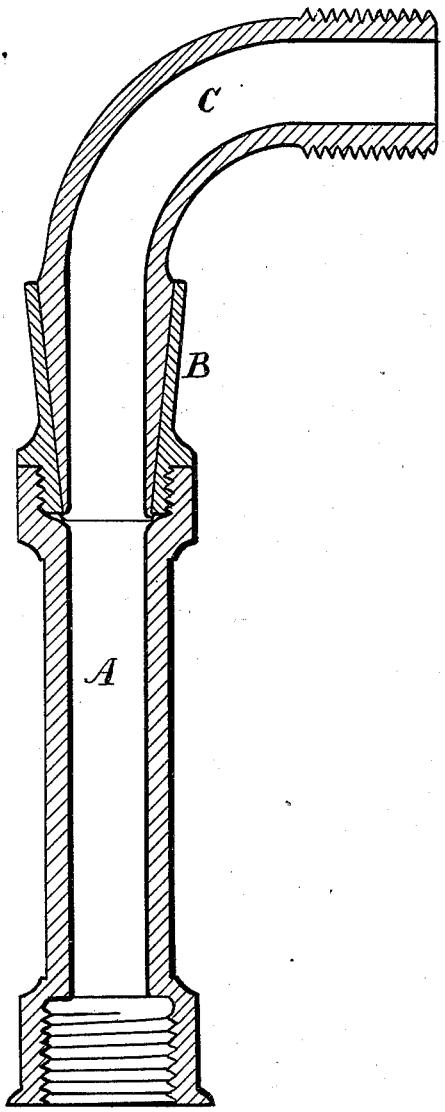
Attest:
Geo. W. Tibbitts
Samuel Osterhold
Inventor:
Charles Gumlich Jr.

UNITED STATES PATENT OFFICE.

CHARLES GUMLICH, JR., OF CLEVELAND, OHIO.

IMPROVEMENT IN HOSE ATTACHMENTS FOR STREET-WASHERS.

Specification forming part of Letters Patent No. 212,599, dated February 25, 1879; application filed January 16, 1879.

*To all whom it may concern:*

Be it known that I, CHARLES GUMLICH, Jr., of Cleveland, in the county of Cuyahoga and State of Ohio, have invented certain new and useful Improvements in Hose Attachments for Street-Washers, which improvements are fully set forth in the following specification and accompanying drawing, in which the figure is a vertical section.

The object of this invention is to furnish a device for attaching or coupling hose to street-washers; and consists of a swivel-jointed elbow, in combination with the hydrant and hose, whereby the connection of the hose to the hydrant may turn as hose may be pulled around, for avoiding the liability of the hose getting into short bends at or near the connection.

In the drawing, A is a short pipe, to be attached to the connection of the street-washer, the object of which is to elevate the swivel-joint a sufficient distance above the bowl to give freedom to play.

The upper end of said pipe A has an enlargement, provided with a screw-thread, into which a tapering sleeve, B, is screwed. Into the said tapering sleeve B is fitted, with a ground joint, the tapering end of an elbow, C.

The lower end of the said elbow has the edge turned outward to form a flange, which extends under the edge of the sleeve B. This flange holds the elbow in the sleeve. The hose is to be connected to the upper end of the elbow.

From the foregoing it will be seen that the elbow C will turn as the hose may be drawn in moving around the field, so that the hose will not be bent or crooked at or near the connection.

I do not wish to be confined to the exact construction of the joint herein described and shown, as other modified forms of a swivel-joint may be used for accomplishing the same result.

Having described my invention, I claim—

In combination with a street-washer, the pipe A, sleeve B, elbow C, fitted to the sleeve B, as described, for attaching hose to the street-washer, substantially as and for the purpose specified.

CHARLES GUMLICH, JR.

Witnesses:
GEO. W. TIBBITTS,
SAMUEL OSTERHOLD.